United States Patent [19]
Steiner

[11] Patent Number: 5,854,632
[45] Date of Patent: Dec. 29, 1998

[54] APPARATUS AND METHOD FOR SIMULATING SPECULAR REFLECTION IN A COMPUTER GRAPHICS/IMAGING SYSTEM

[75] Inventor: Walter Robert Steiner, Enterprise, Fla.

[73] Assignee: Real 3D, Orlando, Fla.

[21] Appl. No.: 731,635

[22] Filed: Oct. 15, 1996

[51] Int. Cl.$^6$ ................................................. G06T 15/50
[52] U.S. Cl. ........................... 395/426; 345/431; 345/432
[58] Field of Search .................................... 345/426–427, 345/431–432

[56] References Cited

U.S. PATENT DOCUMENTS

| | | | |
|---|---|---|---|
| 5,163,126 | 11/1992 | Einkauf et al. | 345/426 |
| 5,222,203 | 6/1993 | Obata | 345/426 |
| 5,253,339 | 10/1993 | Wells et al. | 345/426 |
| 5,566,283 | 10/1996 | Modegi et al. | 345/426 |
| 5,572,635 | 11/1996 | Takizawa et al. | 345/426 |
| 5,659,671 | 8/1997 | Tannenbaum et al. | 345/426 |
| 5,673,374 | 9/1997 | Sakibara et al. | 345/426 |
| 5,704,024 | 12/1997 | Voorhies et al. | 345/426 |
| 5,706,415 | 1/1998 | Kelley et al. | 345/426 |
| 5,710,876 | 1/1998 | Peercy et al. | 345/426 |

OTHER PUBLICATIONS

Forsyth, David, "Reflections on Shading", *IEEE Transactions on Pattern Analysis & Machine Intelligence,* vol. 13 No. 7, Jul. 1991, pp. 679–671.

Cho, Youngkwan, et al, "Improved Specular Highlights with Adaptive Shading", *Computer Graphics International,* IEEE Publication, 1996, pp. 38–46.

Zheng, Qinfen, et al, "Estimation of Illuminant Direction, Albedo, and Shape From Shading", *IEEE Transactions on Pattern Analysis & Machine,* vol. 13, No. 7, Jul. 7, 1991, pp. 680–702.

Murkawa, Naoki, "Estimation of shape, Reflection coefficients and Illuminant Direction from Image Sequence", *Computer Vision,* 3rd Internationalo Conference, pp. 507–512, 1990.

Horn, Berthold K. P., "Impossibe Shaded Images", *IEEE Transactions on Pattern Analysis & Machine Intelligence,* vol. 15, No. 2, Feb. 1993, pp. 166–170.

Langer, M.S., "Diffuse Shading, Visibility Fields, and the Geometry of Ambient Light", *Computer Vision, 1993, 4th International Conference,* Apr. 1993, pp. 138–147.

Foley, James D., et al, "Computer Graphics: Principles and Practices", *Addison–Wesley Publishing Co., 2nd ed. pp. 611–614, 721–814, 1990.*

Peercy, Mark, "Linear Color Representations for Full Spectral Rendering"*ACM Siggraph, Computer Graphics Annual Conference,* 1993, pp. 191–198.

Elbert, Gershon, "Low Cost Illumination Computation using Approximation of Light Wavefronts", *ACM Siggraph, Computer Graphics Annual Conference,* 1994, pp. 335–342.

Guenter, Brian, et al, "Specilized Shaders", *ACM Siggraph, Computer Graphics Annual Conference,* 1995, pp. 343–350.

Primary Examiner—Rudolph J. Buchel, Jr.
Attorney, Agent, or Firm—Geoffrey H. Krauss

[57] ABSTRACT

The final viewable color of each pixel to be displayed responsive to specular reflected illumination intensity from a polygon is determined by generating a data signal, setting a specular component of the present pixel illumination intensity for the associated color, as the product of the intensity of a light source illuminating the polygon, a specular coefficient for that polygon, and a shading term proportional to the exponentiation of the rendered Gouraud Shading Intensity (GSI) for each of a plurality of selected primary colors of a sequence of pixels to be displayed as defining that polygon, by S, a shininess exponent (S) specified for that polygon.

20 Claims, 5 Drawing Sheets

APPARATUS AND METHOD FOR SIMULATING SPECULAR REFLECTION IN A COMPUTER GRAPHICS/IMAGING SYSTEM

FIELD OF THE INVENTION

This invention relates to computer image generation (CIG) or computer graphics systems and, more particularly, to a novel specular reflection determination means for use in a display processor and to novel methods for processing of image data describing specular reflection from object surfaces, for display of two-dimensional representations of those objects in a real-time imaging system.

BACKGROUND OF THE INVENTION

Real-time computer image systems are designed to provide realistic image reproduction for a wide variety of graphics systems, such as tank/vehicle or flight simulators, action games and engineering work stations. For example, graphics-based simulators are used as training devices which permit a combatant to obtain practice without the necessity of going out into the field and using the actual combat systems. The simulators enable a user, such as a pilot or tank gunner, to maintain and improve his skills without the cost associated with live training. It is thus very advantageous to provide the user with video display realism which is beneficial for training and practice purposes.

In a typical real-time computer image generation system, such as a simulator system, image generation can be broken into three separate processing stages: Controller, Geometry Processor, and Display Processor. These three processing stages or sections each work independently on data representative of or corresponding to one of three consecutive scenes to be displayed. The Controller processes data on a scene or image for a fixed time, which may be either a field time of 16.67 milliseconds or a frame time of 33.3 milliseconds, usually the former, and then passes its processed data to the Geometry Processor. This particular field and frame time corresponds to that time for a typical television format display, i.e., two interlaced fields per frame with thirty frames per second. The Geometry Processor has an equal time to do its calculations and at the end of that time its results are sent to the Display Processor. The Display Processor always processes one interlace field for a video display in one field time. For each time interval, all three processors are kept busy, so that, at any given time, the processors are working on three separate scenes. Each section processes inputs and generates outputs during the interval, so data flows through the three stages in a sequential manner. The computational load is spread out among the specialized processor sections, so this allows new scenes to be displayed each field or frame time, even though the results are delayed three fields or frames.

For example, in a flight simulator system, pilot inputs are received by the Controller and after being processed sequentially by the Controller, the Geometry Processor and Display Processor, the output is sent as a color scene to video displays observed by the pilot in the simulator. The data seen by the pilot starts out as simple control inputs applied to an environment definition and is converted to pixel video display information. In the controller, the pilot inputs are used to calculate the new position and orientation of the aircraft, and from this, a mathematical rotation matrix is calculated that is used to rotate objects from the reference coordinate system to a display coordinate system. Any other information dealing with the aircraft, with the position of targets and with other aircraft is also calculated in the Controller. In some applications, the Controller is a general-purpose computer.

The Geometry Processor reads, from a database, descriptions of objects that are potentially visible in the stored three- dimensional digital representation of the scene. The objects that are read are rotated into display coordinates using the rotation matrices calculated in the Controller. Edges of these three-dimensional objects are clipped by the Geometry Processor if they extend beyond the view window boundaries. The Geometry Processor mathematically projects the three-dimensional data onto the two-dimensional display window. In addition, the Geometry Processor calculates which objects are in front or behind other objects and stores this information in a priority list. Each object processed is made up of individual polygons bounded by straight edges. The priority list contains the order of all polygons in the scene, with the first polygon in the list as the highest priority polygon, and the last polygon in the list has the lowest priority. Whenever two polygons overlap on the display, the higher priority polygon will be visible, and the lower priority polygon will be obscured.

The Display Processor receives the two-dimensional face descriptions, along with face color, face fading information, a face priority list, cell texturing, level-of-detail blending, translucency, curvature shading, etc., and uses this information to output data describing to a color display each pixel in the scene. Each color display in the system is typically made up of 1024 lines of video information, with each line having 1024 individual color dots or pixels. However, other combinations of lines and pixels per line are certainly possible. The Display Processor has to resolve, for each pixel, what the color and luminous intensity of the pixel should be, given that many faces can be present in a pixel, that certain portions of faces may be covered by other faces, and that several light sources may be illuminating each surface portion reflecting light into that pixel. Since there can be 1024 by 1024 pixels in the display, and all these need to be calculated in $\frac{1}{60}$th of a second, the processing load in the Display Processor is very high. To calculate video for a multi-display system (a single system has contained as many as 14 displays), the Display Processor must perform in excess of 10 billion computations per second. Due to the tremendous processing load, a Display Processor can drive only a few displays. In some systems, a single Controller and Geometry Processor can be used to drive several Display Processors with several displays connected to each Display Processor. The Display Processor therefore represents the majority of processing in a real-time computer image generation system, and for this reason most of the effort to improve the capabilities and realism of a CIG system is concentrated in the Display Processor area.

One persistent problem has been to process pixel color intensity information so as to provide specular reflection from a surface, e.g., to describe the effects of glare from a surface. Specular reflection is caused by incident light reflected from shiny surfaces—the shinier the surface, the greater the amount of specular reflection. Specular reflection computational methods for obtaining the proper illumination of each pixel, for 3D graphics rendering, are well known to one skilled in the art; but these known methods suffer from the problem that the necessary calculations are computationally very expensive and, therefore, usually not done in real time 3D graphics simulations.

BRIEF SUMMARY OF THE INVENTION

In accordance with the invention, a specular- reflected illumination intensity unit for a display processor in a real-time computer image generator includes: means for receiving input data signals characterizing (a) a specular coefficient (SC) for a polygon presently being rendered, (b) a shininess exponent (S) specified for that present polygon, and (c) an intensity of a light source illuminating that present polygon; means for rendering a Gouraud Shading Intensity (GSI) for each of a plurality of selected primary colors of a sequence of pixels to be displayed as defining that polygon; and means for generating a data signal setting a specular component of the present pixel illumination intensity for the associated color, as the product of the given light source intensity with the selected specular coefficient and a shading term proportional to the exponentiation of GSI by S.

A method for determining the final viewable color of each pixel to be displayed by a display means responsive to specular-reflected illumination intensity from a polygon to be displayed by a real-time computer image generator, comprises the steps of: receiving input data signals characterizing (a) a specular coefficient (SC) for a polygon presently being rendered, (b) a shininess exponent (S) specified for that polygon, and (c) an intensity of a light source illuminating that polygon; inputting data for the rendered Gouraud Shading Intensity (GSI) for each of a plurality of selected primary colors of a sequence of pixels to be displayed as defining that polygon; and generating a data signal setting a specular component of the present pixel illumination intensity for the associated color, as the product of said light source intensity and said specular coefficient and a shading term proportional to the exponentiation of GSI by S, for determining the displayed color intensity of that pixel.

Accordingly, it is an object of the present invention to provide novel apparatus and methods for determining that portion of the color intensity of each pixel in a computer image system display provided by specular reflection from displayed objects.

This and other objects of the invention will become apparent upon reading of the following detailed description of presently preferred embodiments, when considered in conjunction with the associated drawings.

DESCRIPTION OF AN ILLUSTRATIVE EMBODIMENT

Figure 1:
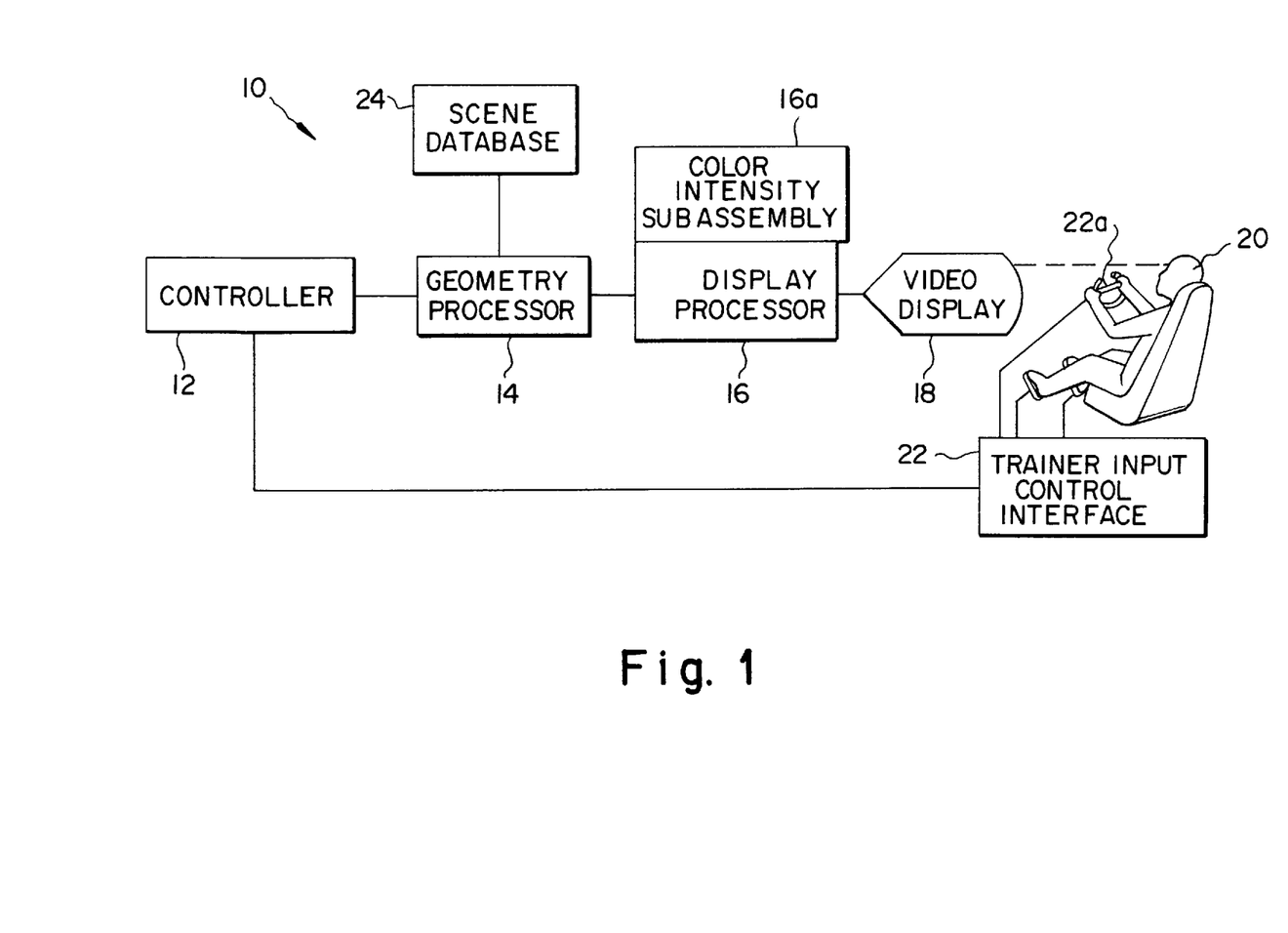
FIG. 1 is a schematic block diagram of a computer image generation (CIG) system in which the apparatus and methods of the present invention may be practiced.

Referring initially to FIG. 1, a functional block diagram of a computer image generation system 10, such as an aircraft cockpit simulation system, is illustrated. For further information as to 3D rendering, the reader is referred to the existing CIG art, including such publications as U.S. Pat. No. 4,727,365, issued Feb. 23, 1988 to Bunker et al., for "Advanced Video Object Generator" and U.S. Pat. No. 4,825,391, issued Apr. 25, 1989 to D. Merz, for "Depth Buffer Priority Processing For Real Time Computer Image Generating Systems", both of which are incorporated herein in their entireties by reference.

The system includes a Controller unit 12, a Geometry Processor unit 14, and a Display Processor unit 16. The Display Processor unit 16 displays information to a cockpit display window 18 to simulate the movement of the aircraft over a scene. A user 20, such as a game player, pilot-trainee or the like, is linked to the computer image generation system 10 through input control interface 22, which may include a joystick or other control input device 22a. The user's maneuvering action at device 22a is fed to input control interface 22. The input control interface converts the appropriate data (e.g. flight data such as aircraft position, aircraft roll, pitch, and yaw attitude) from the user to the Controller 12.

In the Controller 12, the user inputs are used to calculate a new position and orientation of the controlled object (e.g., the aircraft), and from this, a mathematical rotation matrix is calculated that is used to rotate objects from the reference coordinate system to a display coordinate system, which is well known in the art. Other information dealing with the scene, the position of targets, or other objects is calculated in the Controller. In some CIG/3D graphics systems the Controller unit is a general purpose computer.

The Controller unit 12 is updated periodically by the most recent user-controlled-object (aircraft) orientation. This orientation includes the object aircraft roll, pitch, and yaw, and position from the pilot via the input control interface 22, to the Controller 12. The Controller 12 works on a scene for a field or frame time and then passes data to the Geometry Processor 14.

The Geometry Processor 14 reads from a scene database memory 24, descriptions of objects such as towers, roads, rivers, hangars, etc., that are potentially visible in the stored three dimensional digital representation of the earth. The objects are read from the scene database and are rotated into display coordinates using the rotation matrix calculated in the Controller 12. The Geometry Processor 14 clips all edges which extend beyond the view window boundaries in object space. It mathematically projects the three-dimensional object data onto the two-dimensional display window. Object faces which extend beyond display window boundaries are clipped in two-dimensional image space. The two dimensional objects consist of points, lines, closed convex polygons, or combinations thereof. Each closed convex polygon is known as a face. Thus, each object processed is made up of individual faces, where each face is bounded by straight edges. Once the faces are computed from the three-dimensional objects, in the Geometry Processor 14, the data is passed to the Display Processor 16. In addition, the Geometry Processor 14 calculates, in known manner, which faces are in front or behind other faces and stores this information in a priority list. The priority list contains the order of all faces in the scene where the first face in the list is the highest priority face, and the last face in the list is the lowest priority face. Whenever two faces overlap on a display, the high priority face will be visible and the overlap portion of the low priority face will be obscured. After calculating the priority list, the Geometry Processor 14 calculates the display endpoints of the line segments that bound the two dimensional faces and calculates the coefficients of the line equations that describe the bounding edges. The Geometry Processor 14 calculates the endpoints of each edge and the slope of each edge that describe a bounded face. These data are then passed on to the Display Processor 16.

In FIG. 1, there is shown Display Processor 16 that is used to drive the video display 18. In some systems, a single Controller 12 and Geometry Processor 14 is used to drive more than one Display Processor. The Display Processor 16 represents the majority of processing and hardware in a real-time computer generation system and, for this reason, most of the effort to reduce the size of the hardware and processing time has been concentrated in the Display Processor area. The Display Processor is responsible for processing information to be displayed on video display 18. The Display Processor 16 has to resolve for each pixel in the video display 18 what the color of the pixel should be, given the many faces that can be present in a pixel, and those portions of faces that may be covered by other faces. After resolving the priority conflicts within a pixel, the area of each visible face within the pixel is multiplied by the color of the face, and the sum of all these weighted colors is output as a pixel color. The Display Processor 16 thus receives two-dimensional face descriptions from the Geometry Processor 14, along with the face color, and a face priority list, and uses this information to output the scene to color video display 18. Each color display in a system can be made up of 1,024 or more lines of video information and on each line there typically are 1,024 individual color dots or pixels (picture elements). Since there may be more than one million pixels in the display, and all of these need to be calculated in 1/60th of a second for a real-time image, the processing load in the Display Processor is very high. For each pixel the display may receive a 12 bit red data signal, a 12 bit green data signal, and a 12 bit blue data signal as part of intensity information that describe the color of the pixel.

Figure 2:
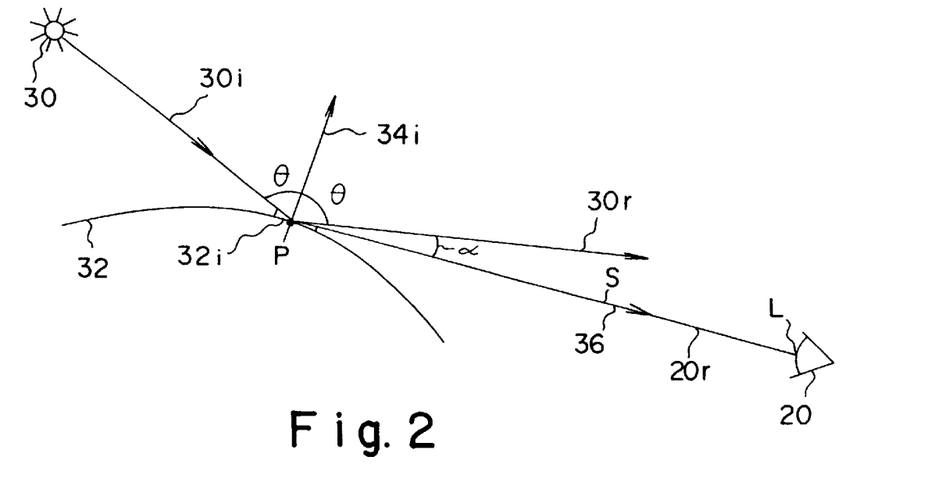
FIG. 2 is a spatial diagram illustrating the relationship between a light source illuminating an object surface and specular reflection therefrom to an observer, and useful in understanding the physics of specular reflection.

Referring now to FIG. 2, one common approach to achievement of accurate illumination effects due to specular reflection is shown. A light source 30 provides light with some chromatic distribution, along a ray 10r which impinges upon a surface 32 at a point P within a small surface incremental portion 32i. The surface portion 32i is typically a small polygonal 2-dimensional area or face, on a generally-3-dimensional surface, and has a vector 34i normal to the 2D surface portion 32i at point P. The incident ray 30i arrives at an angle θ with respect to surface normal 34i and departs, at essentially the same angle θ, as a reflected ray 30r. The reflected ray has illumination chromatic components (typically of red, blue and green hues) each with a magnitude dependent upon the magnitude of that hue in the incident ray 30i and upon the reflective quality of surface increment 32i. The observer 20, at observation location L, receives light ray 36 of an intensity which is some portion of the specularly reflected light, and is dependent upon an angle a between the reflected ray 30r and the observer ray 36. The specularly reflected light amplitude SL is usually given as the product of the source intensity Is and N-th power of the cosine (cos α) of angle a, where the power N both is greater than 1 and is itself empirically determined for various surfaces. Thus, $SL=I_s^*(cos\alpha)N=I_s^*(cos\alpha)\uparrow N$, where ↑ indicates the exponentiation process. This quantity SL determines the amount of reflected light that strikes the eye of observer 20 at location L, but is often too computationally expensive to be done in real-time 3D graphics simulations.

Figure 3:
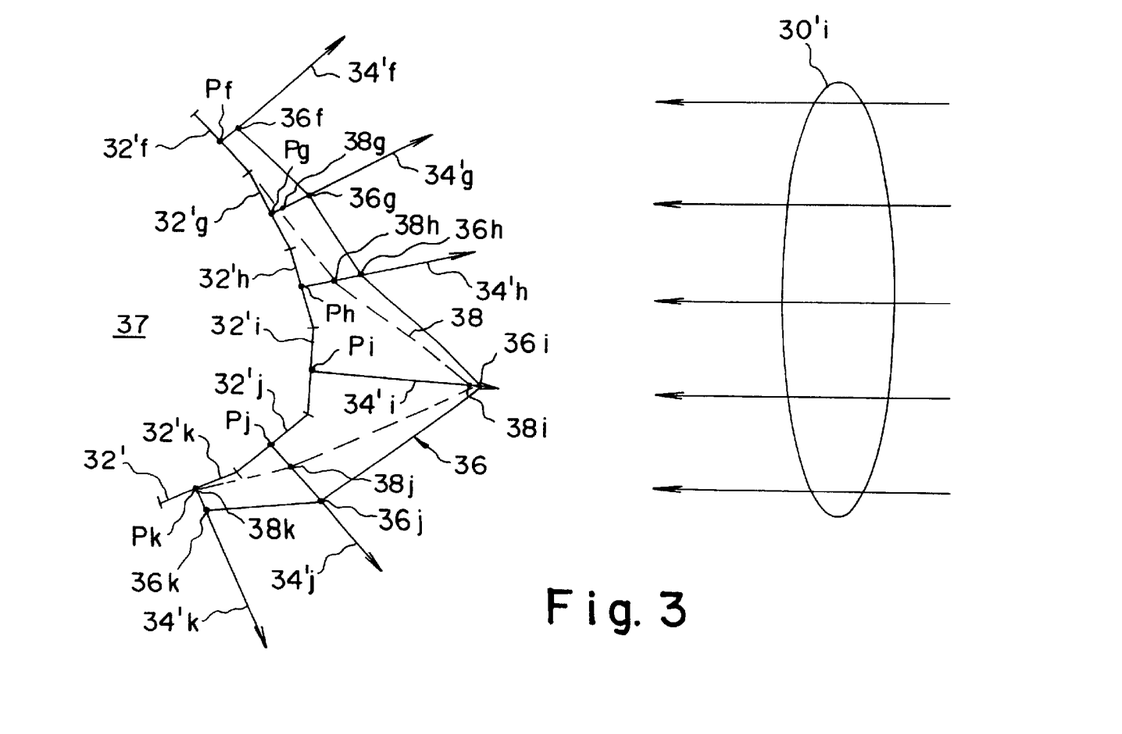
FIG. 3 is a view of an array of object surface segments and of the normals thereto, along with specular reflection illumination intensities of either Gouraud Shading intensity or magnitude in accordance with the present invention.

Referring now to FIG. 3, my presently preferred novel method, while somewhat less physically accurate than the approach hereinabove described, is nevertheless much cheaper to implement computationally and still gives aesthetically pleasing highlights. My method may be provided for in a selected one of many locations within system 10, although use in the Display Processor Color Intensity Subprocessor 16a is presently favored. The Steiner Shininess method approximates each 3-dimensional (3D) surface as a two-dimensional surface 32', in a plane 37 determined such that reflection of each known light source (indicted by incident rays 30'i) by each incremental specular surface portion 32'x (where f≦x≦k, in the example) of surface 32' will generate a Gouraud Shaded Intensity (GSI) value (between −1.0 and +1.0) for the point $P_x$ in that surface increment; Gouraud shading is a well-known method of varying the effective brightness of a 3D illuminated surface. Thus, I use the GSI value at each point P on a surface, to compute a specular reflection component SL of illumination to provide a shading intensity value at that point on a surface; the Gouraud shading intensity is raised to a power S empirically determined by the shininess of the surface portion 32'x, and the exponentiated quantity (GSI)↑S is then multiplied by a specular coefficient SC and the light source intensity $I_s$. This set of arithmetic operations produces the surface portion specular component SL of the reflected light, as $SL=SC^*(GSI\uparrow S)^*I_s$, again, with the symbol ↑ indicated the exponentiation operation. This methodology is repeated, in seriatim or in parallel, for each primary color intensity (e.g., three separate operations, either serial repeats or simultaneous parallels, for the separate red, blue and green components of color intensity for each display pixel).

The specular-reflection color intensity component for each color is added to the same polygon's background color intensity component for that same color, due to ambient light and shading intensity, as defined in the graphics data base by the modeler. Thus, for each color component $PCC_z$, where z is the associated one of the plurality of primary display colors (e.g. z=1, 2 or 3, respectively for the red, blue, green components of a 3-primary-color system), the stored PCC value is given by $PCC_z=SL_z+DL_z$, where DL is the direct light intensity contribution from ambient light sources, and the Gouraud shading associated therewith. In full, for each surface segment 32'x, my method calculates the total intensity $PCC_{x,z}$, of each color (z) contribution to the illumination of a display pixel, as:

$$PCC_{x,z}=SC^*(GSI\uparrow S)^*I_s+PC_{x,z}^*(GSI+LA)$$

where $PC_{x,z}$ is the like-hued polygon color component (e.g. red, blue or green) of a polygon surface portion at point $P_x$, and $PC_{x,z}$ will have color components specified by the modeler in the data base, and with LA being the ambient light (the ubiquitous isotropic light) present in the scene, as specified by the user or by the result of calculations in the processor.

Specular Coefficient SC is a property of a material surface that is being simulated; SC gives the fraction of the spectral light $I_s$ that is reflected from surface 32'. As I use Specular Coefficient, SC would approach 1 for a perfect mirror, and would approach 0 for a very diffused surface. The exponent (S) is the Shininess of the surface; S ranges from 1 for a very diffuse surface, through 100 or more for a shiny surface, and approaches infinity for a perfect mirror, to have an upper bound set by the number of data bits in the Shininess data word utilized in a particular 3D graphics processor. Larger values of (S) produce smaller specular spot sizes. Exponent (S) and its effects are related to, but NOT identical with, the exponent (n) defined at page 728, in Section 16.1.4 of the text "Computer Graphics Principles and Practice", Second Edition, by Foley, van Dam, Feiner and Hughes (published by AddisonWesley).

Solid curve 36 shows the $(\cos \alpha)^N$ curve of Gouraud Shading intensity as given by the prior art, accurate-but-complex approach, while the broken-line curve 38 shows the shape of the more-easily-calculated Steiner Shading curve of the present method. It will be seen that some differences are readily apparent for a display having only a few polygons and thus with relatively large distances between polygon vertices. As the number of polygons in a model become larger and hence the distance between polygon vertices becomes smaller, the shape of the Steiner Shading curve 38 approaches the $\cos(\alpha)^N$ curve 36. Thus, this method produces specular reflection color intensities that have the approximate shape of the accurate illumination approach for objects consisting of many small polygons. However, in this approach the position of the highlights on the object are determined by the direction of the illumination source and the surface normals, while in the accurate illumination approach the highlights are determined by the direction of the illumination source, the surface normals and the direction to the eye.

Figure 4:
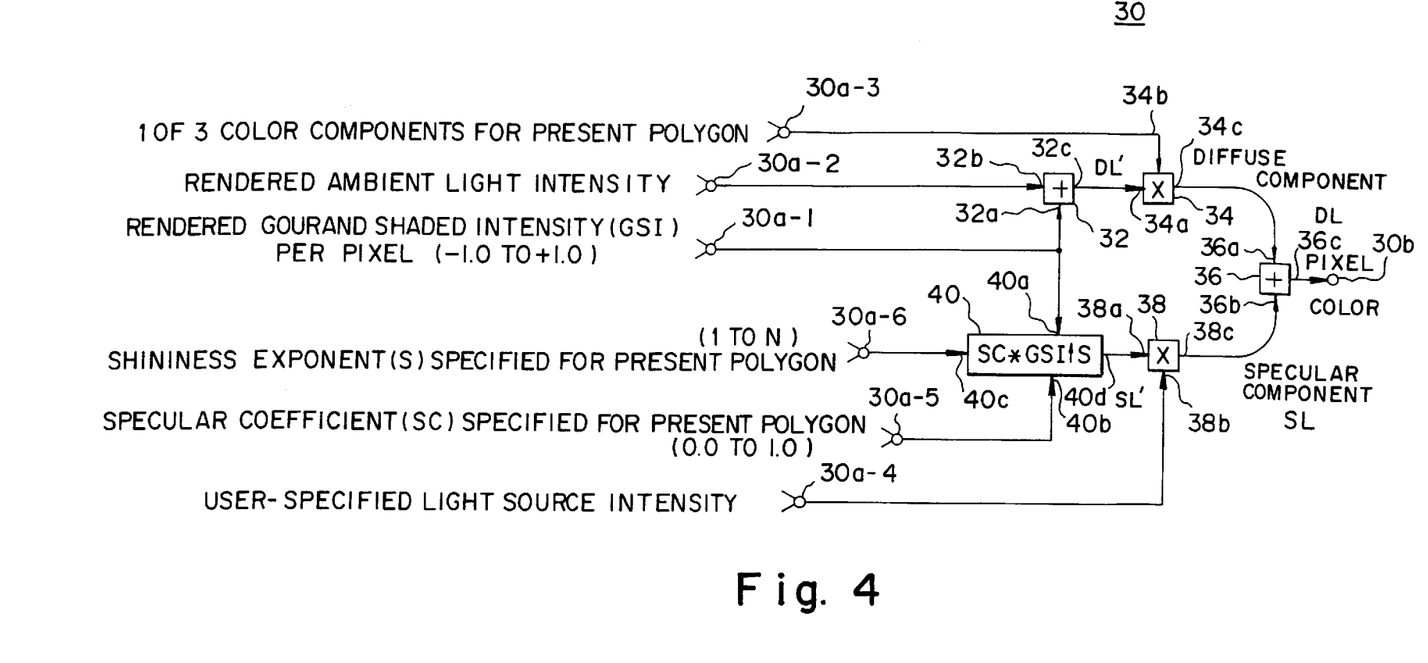
FIG. 4 is a block diagram of a specular reflection color intensity data processing unit, in accordance with the principles of the present invention, for use in a CIG display processor.

Referring now to FIG. 4, one presently preferred specular reflection color intensity data processing unit 30, for use in a subassembly 16a and the like, is shown. Unit 30 receives digital data words at its input ports 30a-1 through 30a-6 and provides digital pixel color data words at an output port 30b. A previous pixel renderer (not shown) provides rendered GSI digital data via unit input 30a-1, for coupling to both a first input 32a of a first digital adder means and a first input of an arithmetic/exponentiation means 40. Rendered ambient light intensity data is provided, via input 30a-2, to the other input 32b of the first adder means, which transfers its output data to a first input 34a of a first digital multiplier means 34. The other input 34b of means 34 receives the digital data word, from unit input 30a-3, for the ambient light intensity of that one of the three primary colors then being processed. The resulting digital data product, at output 34c, is the diffuse light component of that component color for that pixel, and is coupled to a first input 36a of an output adder means 36.

The intensity digital data for the illuminating (specular) source, which is generally user specified, is provided via unit input 30a-4, to an input 38b of a second digital multiplier means 38, with an output 38c connected to provide the calculated specular component of the pixel color to the other input 36b of the output adder means. Second multiplier means second input 38a is connected to the output 40d of means 40. The Specular Coefficient (SC) digital data word for the present polygon is provided at unit input 30a-5, and in connected to a second input port 40b of means 40, which also has a third digital data port 40c receiving, via unit input 30a-6, the data bits of the Shininess (S) number for the present polygon. Means 40 first calculates the exponential (GSI↑S) and then multiples by the specular coefficient SC, to obtain the data needed at input 38a, for determining the pixel color intensity specular component.

I presently prefer to reduce cost even further by approximating the exponentiation calculation (GSI↑S), using a truncated Taylor-series expansion or other polynomial approximation. I current prefer to approximate GSI↑S by summing M terms of $C_m{}^*GSI^m$, where the maximum exponent N is the next value of 2↑n which is larger than the selected integer Shininess value S. Thus, $$(GSI{\uparrow}S){\approx}C_1{}^*GSI+C_2{}^*GSI^2+C_4{}^*GSI^4+C_8{}^*GSI^8+C_{16}{}^*GSI^{16}+$$

the coefficients $C_i$ are generally less than 1, and can be set to any value between 0 and 1 if a full digital divider is used. To simplify the calculations even further, I use only coefficients $C_i$ of the form $2^{-I}$, where I is an integer, so that the product of $C_i{}^*GSI{\uparrow}I$ can be provided by use of digital data shift stages, rather than a full digital divider. Note that in a typical use, many of the $C_i$ coefficients are set to zero, if not near to the selected value of S. For example, one approximation of S=150 is with $C_{64}$=0.1 in the seventh term of the expansion, $C_{128}$=0.5 in the eighth term, and $C_{256}$=0.4 in the ninth term, with all other coefficients set substantially to zero.

Figure 5A:
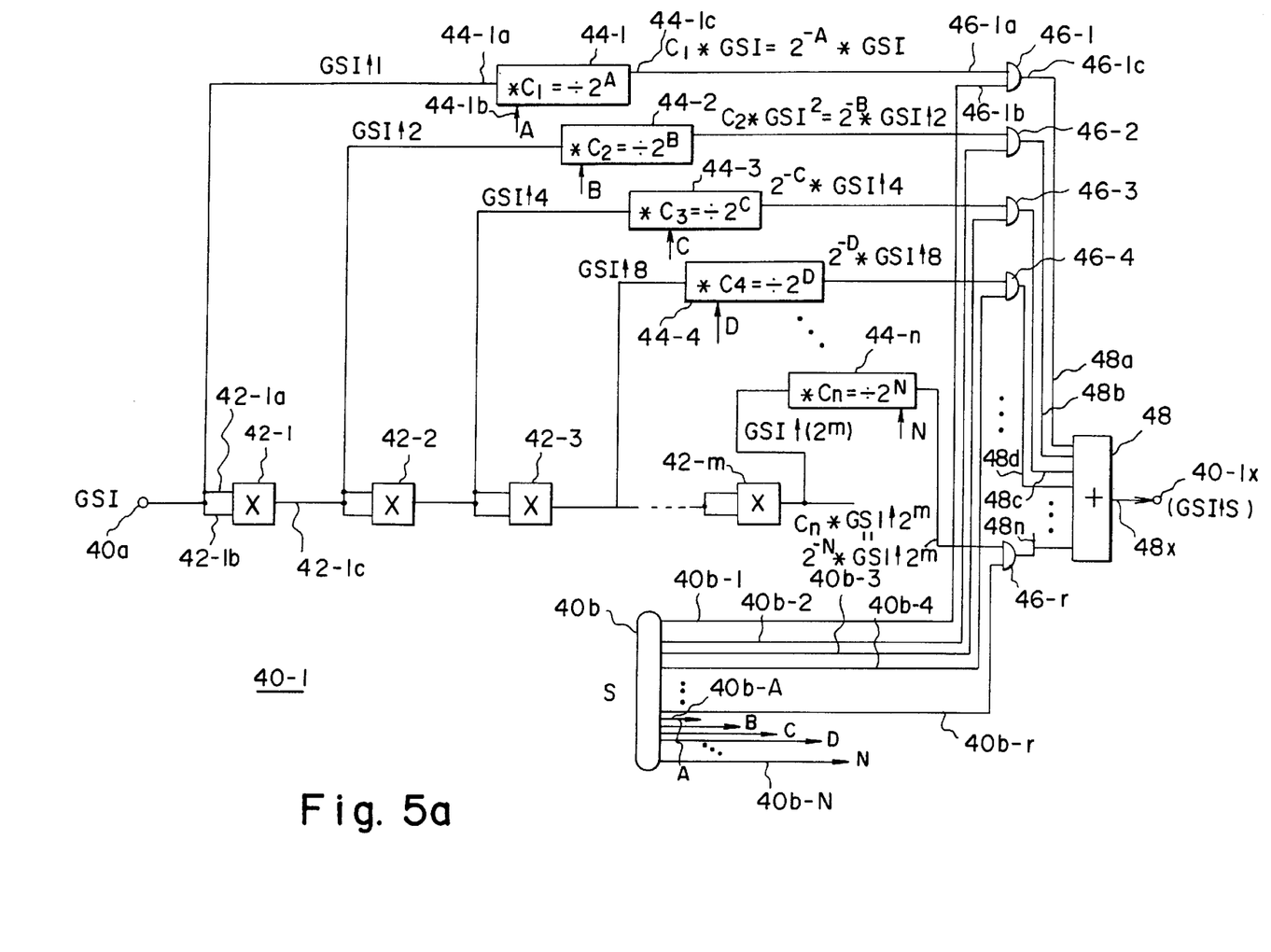
FIGS. 5a and 5b are schematic block diagrams of two different Shininess exponential approximator for use in the unit of FIG. 4.

FIG. 5a shows a schematic diagram of a first embodiment 40-1 of a circuit for performing this (GSI↑S) function, with some number M of digital multiplication means 42. Each means 42-i, where $1{\leq}i{\leq}m$, has both a first input 42-ia and a second input 42-ib simultaneously receiving the same input data, so that the output 42-ic provides the second power (square) of the input. Each of a set of n=m+1 coefficient multiplier circuits 44-j, for $1{\leq}j{\leq}n$, operate on the associated data word $GSI{\uparrow}(2^{i-1})$; the particular multiplier chosen may provide the $C_i{}^*$, multiplicative coefficient and operation by instead dividing by a factor of $2^I$, for integers $A{\leq}I{\leq}N$, as in an I-stage data shifter. The shifter circuit input 44-ja receives the exponentiated GSI data from either the unit input 40a or the associated multiplier 42-ic output, and may receive shift/divisor factor I data at a second input 44-jb, from the S data port 40b. Each stage scaled output 44-jc provides the dataword $(2^{-I}){}^*(GSI{\uparrow}i)$. Each of a like plurality of AND gates 46j receives the associated divisor unit output 44-jc data and a stage-j S-control bit on an associated control line 40b-j from the S input port 40b. If the S bit on line 40b-j for a j-th stage is 0, then the gate does not pass the data to an associated input 48j of a multiple-input adder means 48; conversely, if the S bit on line 40b-j is 1, the j-th-stage gate passes the data to the input 48i, for inclusion in the data sum at output 48x, which is the approximation to (GSI↑S) at unit output 40-1x (for subsequent multiplication by coefficient SC). The series expansion coefficient integers I can be selected by the modeler to provide the desired shading effect. Note that a more cost-effective unit 40-1 may have fixed-integer coefficient shifters 44, which limits the number of S values attainable for a fixed number of squarers 42, but removes the cost of both a more complex data port 40b, by removing the control lines 40-bI, and of variable-controlled shifter means 44.

Figure 5B:
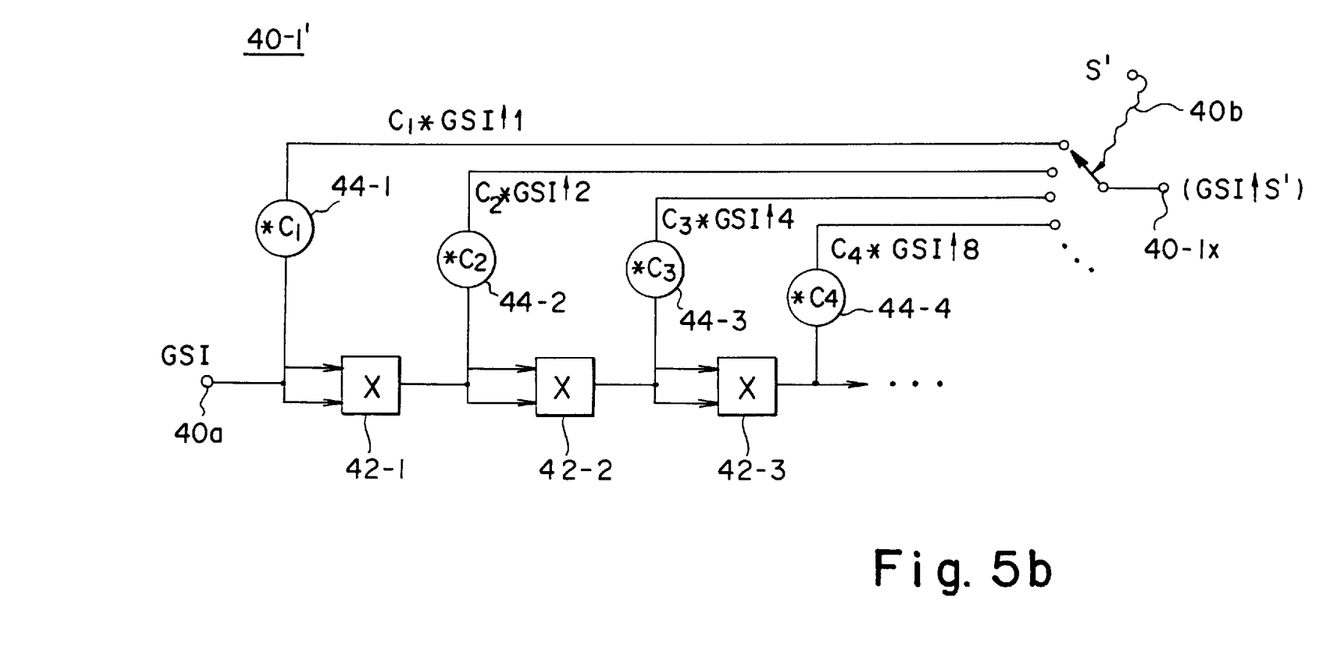

FIG. 5b illustrates an even more cost-effective embodiment 40-1', for those situations where the shininess exponential term can be satisfactorily approximated by only a single power term. Thus, S may be only crudely approximated by one term, such as $C_1{}^*GSI$ or $C_2{}^*GSI^2$ or $C_3{}^*GSI^4$ or ... $C_k{}^*GSI{\uparrow}(2^{k-1})$, without summations or finer approximations. Here, the output of each of the M coefficient multiplier stages 44 is individually connected to a different one of the (M+1) inputs of a "single-pole" selector means, i.e. a means for selecting only one of the M+1 data words, responsive to the S' data at input 40b, with data word S' now having only one non-zero bit, which selects the desired scaled power-of-2 exponential term to be used.

While several presently preferred embodiments of the apparatus and methods for determining pixel color content in a computer image generator has been described in detail herein, many variations and modifications will now become apparent to those skilled in the art. It is therefore our intent to be limited only by the scope of the appending claims and not by way of the specific instrumentalities and steps presented by way of explanation herein.

What is claimed is:

1. A specular-reflected illumination color intensity data processing unit for a display processor in a real-time computer image generator, comprising:

means for receiving separate input data signals characterizing (a) a specular coefficient (SC) for a polygon presently being rendered, (b) a shininess exponent (S) specified for said polygon, and (c) an intensity ($I_s$) of a light source illuminating that polygon;

means for receiving a Gouraud Shading Intensity (GSI) data signal for each of a plurality of pixels to be displayed as defining said polygon; and means for generating a data signal (SL) setting a specular-reflected component of the present pixel illumination intensity as the product of said light source intensity $I_s$ data signal and said specular coefficient (SC) data signal and a data signal for a shading term proportional to the exponentiation of GSI by S.

2. The graphics data processing unit of claim 1, further comprising means for adding a diffuse component data signal to said specular component data signal to generate a total pixel color intensity signal for determination of actual color and intensity of the displayed pixel.

3. The graphics data processing unit of claim 1, wherein said generating means includes: first means for providing a digital data signal (SL') responsive to a product of the specular coefficient SC and the GSI data signal digitally exponentiated by the shininess S data signal; and means for digitally multiplying the light source intensity $I_s$ data signal and the SL' digital data signal, to provide the specular component SL digital data signal.

4. The graphics data processing unit of claim 3, wherein said first means includes means for digitally multiplying said specular coefficient SC data signal and an approximation of said exponentiated GSI digital data signal, for providing said SL' data signal.

5. The graphics data processing unit of claim 4, further including means for approximating the exponentiated GSI digital data signal, responsive to selection of at least one data signal generated as a different term of a digital series expansion of the exponentiated GSI data signal.

6. The graphics data processing unit of claim 5, further including means for modifying each selected expansion term data signal by an associated term data coefficient word.

7. The graphics data processing unit of claim 5, wherein said approximating means includes: a plurality m of squarer means, arranged in a sequential chain, each for generating an output data signal which is a second power of an input data signal, the first squarer means receiving the input GSI data signal to cause the output of the i-th squarer means, where $1 \leq i \leq m$, to generate a data signal of $(GSI)\uparrow(2i)$; and means for selecting at least one of a set of said input GSI data signal and stage data output signals, for providing each of said expansion term data signals.

8. The graphics data processing unit of claim 7, further including means for modifying each i-th one of said input GSI signal and said squarer means output data signals by a selected fractional coefficient $C_i$ to obtain each of said expansion term data signals.

9. The graphics data processing unit of claim 8, wherein said selecting means includes means for summing a plurality of expansion term data signals to approximate said SL' data signal.

10. The graphics data processing unit of claim 8, wherein said selecting means includes means for selecting only one of said expansion term data signals to approximate said SL' data signal.

11. A method for determining the final viewable color of each pixel to be displayed by a display means responsive to specular-reflected illumination intensity from a polygon to be displayed by a real-time computer image generator, comprises the steps of:

(1) receiving separate input data signals characterizing (a) a specular coefficient (SC) for a polygon presently being rendered, (b) a shininess exponent (S) specified for that polygon, and (c) an intensity ($I_s$) of a light source illuminating that polygon;

(2) inputting data for a rendered Gouraud Shading Intensity (GSI) value for each of a plurality of selected primary colors of a sequence of pixels to be displayed as defining that polygon, (3) generating a data signal (SL) setting a specular-reflection component of the present pixel illumination intensity for the associated color, as the product of: (x) the light source intensity $I_s$ data signal, (y) the specular coefficient (SC) data signal, and (z) a data signal for a shading term proportional to the exponentiation of GSI by S; and (4) displaying that pixel responsive to the specular-reflection color intensity data generated in step (3).

12. The graphics processing method of claim 11, farther comprising the step of adding a diffuse component DL data signal to the specular component SL data signal to generate a total pixel color intensity signal for determination of actual color and intensity of the pixel displayed in step (4).

13. The graphics processing method of claim 11, wherein the generating step (3) includes the substeps of: first generating a digital data signal (SL') responsive to a product of the specular coefficient SC and the GSI data signal digitally exponentiated by the shininess S data signal; and then digitally multiplying the light source intensity $I_s$ data signal and the SL' digital data signal, to provide the specular component SL digital data signal for use in step (4).

14. The graphics processing method of claim 13, wherein said first generating step includes digitally multiplying the specular coefficient SC data signal and an approximation of said exponentiated GSI digital data signal, for providing the SL' data signal.

15. The graphics processing method of claim 14, wherein the step of approximating the exponentiated GSI digital data signal includes the steps of: generating a multiple-term digital series expansion of the S-exponentiated $(GSI\uparrow S)$ data signal; and selecting at least one different term of the resulting digital data signal series expansion as the desired approximation of the exponentiated GSI data signal.

16. The graphics processing method of claim 15, further including the step of modifying each selected expansion term data signal by an associated term data coefficient word.

17. The graphics processing method of claim 15, wherein the series expansion generating step includes the substeps of: generating a sequence of m different stage output data signals with the output data signal for the i-th stage, where $1 \leq i \leq m$, being $(GSI)\uparrow(2i)$; and selecting at least one of a data set of the input GSI data signal and the m different stage data output data signals, as each of the expansion term data signals.

18. The graphics processing method of claim 17, further including the substep of modifying each i-th one of the data set terms by a selected fractional coefficient $C_i$ to obtain each of the expansion term data signals.

19. The graphics processing method of claim 18, further including the substep of summing a plurality of expansion term data signals to approximate the SL' data signal.

20. The graphics processing method of claim 18, further including the substep of selecting only one of the expansion term data signals to approximate the SL' data signal.

* * * * *